3,039,927
PHARMACEUTICAL COMPOSITION COMPRISING ASPIRIN AND SORBITOL
Louis Lafon, 86 Ave. de la Republique, Paris, France
No Drawing. Filed Oct. 22, 1958, Ser. No. 768,849
Claims priority, application France Mar. 19, 1958
1 Claim. (Cl. 167—65)

This invention relates to improved pharmaceutical compositions, and its general object is to provide such compositions, particularly fever-killing and pain-killing drugs, whereof the time of activity is lengthed, and the potency increased.

A considerable amount of research work has been carried out on the general problem of prolonging the activity of drugs. Thus, substances have been used which act to block renal excretion; high-molecular weight, high-viscosity compositions have been investigated in this connection. However, the use of substances of this class is not without danger, particularly danger of lesions to the kidneys.

In accordance with the present invention, it has been found that the activity of certain drugs can be prolonged, and their potency generally enhanced, by adding sorbitol thereto.

The drugs susceptible to the improvement of the invention include those wherein the pK value is equal or substantially equal to 3, and more particularly analgesic (pain-killing) and/or antipyretic (fever-killing) drugs such as acetylsalicylic acid or aspirin and phenyl-1-dimethyl-2,3-pyrazolone-5 or antipyrine.

It will be noted that each of these compounds includes one or more functional groupings capable of reacting with sorbitol.

The novel compositions of matter provided in accordance with this invention, therefore, should be regarded primarily as chemical compounds rather than mixtures.

It will also be noted that the beneficial effects of this compounding step are entirely unexpected since sorbitol per se does not display any analgesic or antipyretic activity.

Two illustrative examples will now be given, the first describing addition of sorbitol to acetylsalicylic acid or aspirin, and the second addition of sorbitol to antipyrine, and the results will be indicated of tests conducted therewith on rats and mice and compared to the corresponding results obtained with the basic drug alone, without sorbitol addition.

EXAMPLE 1

When acetylsalicylic acid (aspirin) is mixed with sorbitol in suitable ranges of proportions to be specified it is found that the resulting composition is considerably more potent than is aspirin alone, and also that the activity of the drug is greatly accelerated while the duration of such activity is substantially increased.

A compound according to the invention was prepared by the following process. First, thionyl chloride was reacted with acetylsalicylic acid to yield acetyl-salicylic chloride having the formula

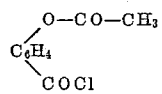

For this purpose, into a one-liter spherical flask, 180 grams (1 mole) acetylsalicylic acid and 260 grams (2 moles) thionyl chloride were introduced. The flask was heated moderately with reflux refrigeration for about 45 minutes, at which time a clear, slightly yellowish liquid was obtained. The excess thionyl chloride was distilled off under vacuum and the fraction distilling at pressures below 7 mm. Hg at 131–133° C. was recovered. The reaction yield was about 80%.

In a second step, sorbitol diacetylsalicylate was obtained by reacting the chloride resulting from the first step just described with sorbitol, at ordinary temperature and in the presence of pyridine. In a 1-liter flask, 91 g. (½ mole) sorbitol and 400 cc. of freshly distilled pyridine were placed, and 198 g. (1 mole) acetylsalicyl chloride were gradually added, while cooling with a stream of cold water to prevent the temperature in the flask from rising above about 45 or 50° C. The reaction mixture was allowed to stand 3 hours at ordinary temperature, then the clear resulting solution was poured into 1.5 liter of 20% sulfuric acid and crushed ice. A pink oily substance separated and was extracted with 250 cc., followed by three amounts of 100 cc. chloroform, and the resulting extract was washed with 50 cc. 20% sulfuric acid, then twice in 100 cc. water.

After drying over anhydrous $Na_2SO_4$ and removal of the heating in a water-bath to remove the chloroform, the paste-like residue was taken up in twice its weight of hot chloroform and the solution was precipitated with 5 volumes of petroleum ether. The oil separated off in a water bath was dried in a vacuum and then in an "exsiccator" during several days to eliminate any traces of solvent liable to prevent setting. The final product was thus obtained and found to set, when in a thin layer, into a vitreous mass which is ground into a light white powder.

The reaction yield is in the range from 20 to 35%. The product was found to contain from 49.05 to 50% acetylsalicylic acid by Astruc's method (French Pharmacopoeia, 1949, page 13).

(A) Antipyretic Action

This action was investigated on white rats in which hyperthermia was induced by subcutaneous injection of an aqueous suspension of beer yeast or barm. A 15% macerate of dry powdered barm in accordance with pharmacopoeia standards was used in the proportion of 0.35 cc. of dry barm powder per 100 grams body weight of the test animal.

The antipyretic was administered by probang 15½ hours after injection of the barm. It had been demonstrated that the hyperthermia would normally persist 24 hours and would not be reduced by oral administration of physiological serum. Therefore, the procedure described made it possible to investigate the effect of an antipyretic over a minimum period of 8 hours.

The experiment was applied to 60 white rats which had been made to fast for 24 hours to prevent irregular absorption of the drug due to presence of food in the stomach.

The comparative tests determined the effect of aspirin alone in a dose of 0.20 g. per kg. body-weight, the effect of sorbitol alone in a dose of 2 g. per kg., and the effect of mixtures comprising 0.2 g. per kg. aspirin with variable quantities of sorbitol, namely, in ratios of 1/2, 1/1, 2/1 and 10/1 with respect to the aspirin.

In these tests the aspirin was used in a 5% suspension in gum arabic and with the specified quantities of sorbitol where this was used. Where the sorbitol was tested alone, an aqueous solution of 10% was used.

The test results are summarized in the attached tables. In Table I, the effect of aspirin alone is compared with the effect of aspirin mixed with equal amounts of sorbitol and with the effect of aspirin mixed with twice its amount of sorbitol. In Table II, the effect of aspirin mixed with one half its amount of sorbitol is compared with the effect of aspirin mixed with ten times its amount of sorbitol. In Table III, the effect of aspirin alone is compared with the effect of aspirin mixed with ten times its amount of sorbitol. In Table IV, the effect of aspirin alone is compared with the effect of aspirin mixed with an equal amount of sorbitol.

The tables show conclusively that except in that case where the aspirin is mixed with one half its amount of sorbitol, the effect of the aspirin is increased both in intensity, in speed of action and also in duration, by the addition of sorbitol thereto. The increase in duration is greatest where the sorbitol is used in a proportion 10 times greater than that of the aspirin.

The results are confirmed by a study of Table V, in which the effect of aspirin alone is compared with that of an aspirin-sorbitol combination in the ratio of 1/10 respectively, and with the effect of sorbitol alone which is seen to possess no antipyretic properties whatever per se.

(B) *Analgesic Action*

The procedure used herein for determining analgesic activity involved producing pain in the test animal by intraperitoneal injection of an irritant, specifically phenylquinone; 0.25 gram of a 2 per mile solution of phenylquinone is 5% ethyl-alcohol was injected. Such injection results in a characteristic syndrome including intermittent contractions of the abdomen, spinning and rotation of the trunk, and extension of the rear limbs. A preliminary check was made to determine that all the mice used reacted positively to the phenylquinone injection. The analgesic, i.e. aspirin alone or in admixture with sorbitol, was given orally at variable times after the irritant injection.

696 mice were tested. The intensity of the analgesic action was indicated in each case as the proportion of mice that were found to be relieved of the pain syndrome; the promptness and durability of the action were also ascertainable by noting the times at which the pain syndrome ceased and reappeared.

The results of these tests are summarized in the attached Table VI, wherein the effects are noted of aspirin alone given in a dose of 0.2 g. per kg. body weight, that of a 1/1 mixture of aspirin and sorbitol given in the same dose, that of a 1/2 aspirin/sorbitol mixture, and finally that of a 1/10 aspirin/sorbitol mixture. The effects of sorbitol alone are also noted.

The experiments show that, except in the cases where the amount of sorbitol used was one half the amount of the aspirin, the combination of aspirin with sorbitol had a much more potent analgesic action that aspirin alone.

In the cases where the sorbitol was used in an amount 10 times higher than the aspirin, it was found that a very definite increase was obtained both in the promptness and in the duration of the analgesic action. For, whereas at the end of 100 minutes, aspirin alone was ineffective, 50% of the mice were still relieved of pain 150 minutes after administration of the composite drug. Also, whereas the effect of aspirin first set in not earlier than 15 minutes after the drug has been given, 70% of the mice were already relieved as early as 5 minutes after administration of the composite drug containing 10 times more sorbitol than aspirin. 50% of the mice were relieved within the time period from 25 minutes to 60 minutes in the case of aspirin alone; whereas from 90 to 100% of the mice were relieved within the same time period in three of the cases where aspirin and sorbitol were given simultaneously. It was also found that sorbitol alone even at doses as high as 2 grams per kg., exerts no analgesic action whatever.

Clinical tests have also been carried out with respect to the mixture of acetylsalicylic acid and sorbitol in substantially equal proportions by weight. The mixture was prescribed to certain patients selected at random in a hospital ward among those inmates warranting the use of an analgesic. The action of the mixture was compared, for each patient, with the action of aspirin and with that of a placebo.

*First patient.*—A 68 year-old man was suffering from the painful sequels of ophthalmic zona, with continuous and lively pain chiefly at night.

Aspirin when administered produced a slight sedative action for about 4 hours. A 0.50 g. tablet had to be taken again in the middle of the night. The patient was wakened by the pain.

The mixture of aspirin and sorbitol resulted in a definite abatement of the pain. A single tablet taken in the evening enabled the patient to spend a restful night. The patient's condition was greatly improved after five days of this treatment involving a single tablet at bedtime.

Substitution of a placebo resulted in a resumption of the pain.

*Second patient.*—A 69 year-old woman was suffering from the painful sequels of intercostal zona and had previously undergone a treatment with vitamin B, radiotherapy and histamin, all without apparent effect.

Aspirin yielded very slight abatement of the pain on absorption of 2 to 3 tablets a day.

The aspirin-sorbitol mixture resulted in some sedation on absorption of two tablets a day, but the pain however persisted. Nevertheless the patient felt relieved and takes to the tablets at less frequent intervals.

*3rd patient.*—A woman suffering from arthrosis of the side.

Aspirin yielded a slight abating of the pain, but walking remained very difficult.

The aspirin-sorbitol mixture resulted in a very marked improvement after absorption of two tablets a day. The patient is able to walk without any trouble and says she feels transformed.

The placebo resulted in a resumption of the pain.

*4th patient.*—A 68 year-old man suffering from very painful common lumbago, underwent complete cure within 24 hours on absorption of 2 cachets.

*5th patient.*—A 82 year-old woman was suffering from a thalamic syndrome. Aspirin alone, and the aspirin-sorbitol combination both remained ineffective.

*6th patient.*—A 65 year-old woman was suffering from diffuse arthrosis and had great trouble walking.

Aspirin produced slight improvement on absorption of 2 or 3 cachets daily.

The aspirin-sorbitol combination yielded a very marked improvement enabling the patient to walk with greater ease and with much less suffering on absorption of only a single cachet a day.

The placebo resulted in a resumption of the functional difficulties and pain.

*7th patient.*—A 72 year-old woman was suffering from intercostal neuralgia.

The aspirin-sorbitol combination, vitamin B, sulfur and iodine were all used without any apparent effect.

*8th patient.*—A woman was suffering from arthrosis of the knee.

Aspirin produced an improvement on absorption of 2 cachets a day.

The aspirin-sorbitol combination yielded a markedly greater improvement after absorption of a single cachet a day.

Placebo resulted in resumption of the pain syndrome.

*9th patient.*—A 68 year-old man was suffering from common lumbago.

After absorption of 2 cachets of the aspirin-sorbitol combination, the patient was cured within 24 hours.

*10th patient.*—A 72 year-old man was suffering from diffuse arthrosis.

Aspirin produced slight improvement but the pain and the functional inability syndrome remained.

The aspirin-sorbitol composition was given in admixture with thionaiodine because of the patient's request for injections. A very marked improvement was noted. The pain was almost removed and the patient was able to walk again.

When the aspirin-sorbitol mixture was given without the thionaiodine, the patient was able to walk freely but insisted that the preceding treatment was more effective.

To test this allegation of the patient's, the aspirin-sorbitol mixture was added to physiological serum and injected. The ensuing improvement in the patient's condition was as remarkable as in the case of the aspirin-sorbitol-thionaiodine composition.

When a placebo serum composition was injected the pains resumed and the patient was again unable to walk.

From the above clinical tests it is apparent that the aspirin-sorbitol composition is a highly effective analgic, being superior to aspirin both as to the strength and persistence of the results obtained. None of the treated subjects complained of gastric intolerance.

In another series of tests, the aspirin and sorbitol combination, in equal proportions by weight, was given to twenty patients and in each case the results were noted concerning effect on the pain, on the progress of the disease, and any differences in the action of aspirin alone.

The twenty cases referred to are broken down as follows:

One case of periarthritis of the shoulder was abated in 4 weeks with 2 cachets a day;

3 lumbago cases was abated in 48 hours with 2 cachets a day;

2 cases of generalized rheumatism of a type associated with post-menopause arthrosis, were relieved in 3 days with 1 to 2 cachets a day;

One dental accident in a gastritic patient was relieved in 24 hours with 2 cachets;

Three cancer cases included:
  Facial, no result,
  Pancreas, moderate result,
  Rachis, no result;

One case of intercostal neuralgia was relieved in 3 days, 1 cachet a day;

2 cases of influenza in a patient suffering from duodenal ulcer was relieved in 24 hours with 2 cachets;

2 cases of arthrosis of the hip were relieved in one month with 2 cachets a day;

2 cases of sequellae of intercostal zona were abated in 15 days with 2 cachets a day;

One case of chronic developing polyarthritis was improved by 50% in 15 days with 2 cachets a day;

One case of thalamic syndrome, without result;

One case of abdominal adhesional polyalgia in a female gastritic patient, with moderate result.

In every one of the sixteen cases where a positive result was had, the following was noted:

(1) The compound drug exerted a remarkably quicker action on the pain than did aspirin alone.

(2) The drug's activity was greatly increased, in that 2 cachets a day were sufficient where it was generally necessary to use four 0.50 tablets of aspirin.

(3) There was a complete absence of digestion trouble, especially in respect to the three patients, one suffering from ulcer and two from gastritis, who usually did not tolerate aspirin well.

Further clinical tests were conducted in May 1958 at Lariboisiere Hospital in Paris and fully confirmed the patent superiority of the aspirin-sorbitol mixture or compound as compared to aspirin alone.

Finally, the applicant conducted a series of tests at Tenon Hospital, Paris, with especial emphasis on objectivity. It is well-known that the analgesic action of aspirin and the like is extremely difficult to investigate quantitatively in view of the subjective character of the test available to the clinician. Thus, some patients are known to react positively to "placebos."

Recently, Paul and Dyer on the one hand, Batterman and Kronck on the other, have independently developed a method of testing the concentration of aspirin in the bloodstream, and specifically the plasmatic salicylhaemia as an objective and quantitative test of the relative efficacy of salicylic derivatives applied in various chemical and/or physical forms.

This method was here used and the plasmatic salicylhaemia was determined in patients to whom the compound of the invention was administered, at times varying from 10 to 180 minutes after the drug was absorbed.

Further, the urinary elimination of the salicyl ion was determined after administering the aspirin-sorbitol compound.

Finally, hemikresis and protorrhaea were investigated by the method of Lapp.

To enhance the objective character of the salicylhaemia tests, the so-called "triple-blind" procedure was followed, in which the clinician, the patient and the operator are all ignorant of the composition of the drug administered, and this composition is disclosed only on completion of the test run. The drugs are given in the form of cachets of similar equal weight and aspect, labelled No. 1 and No. 2. The formula of each cachet is disclosed only at the end of the experiment. In this instance cachet No. 1 was revealed to be 1/1 mixture of 0.50 g. aspirin and 0.50 g. sorbitol; cachet No. 2 contained 0.50 g. aspirin and 0.50 g. lactose.

The test was applied to fasting patients to improve the regularity of the absorption of the drugs in accordance with previous findings. Each subject was given a cachet No. 1 and a cachet No. 2, 48 hours later. The salicyclic concentration in the plasma was determined at times of 10, 20, 90 and 180 minutes after administering of each drug. The tested subjects were men and women of from 25 to 70 years of age, all in-patients of Hospital Tenon.

The procedure used for salicylhaemia analysis was that described by Trinder. It essentially consists in defecating the plasma with mercury bichloride in a hydrochloric medium and determining the color of the filtrate as produced by the salicylate ion in the filtrate on reaction with a ferric ion.

The great advantage of this procedure over the conventional procedures (e.g. Brodie) is that it is extremely quick, since it is possible in a single step to add a reagent containing both the defecant and the ferric ion without preliminary extraction in an organic phase and agitation in an aqueous phase. The procedure involves adding to 1 cc. of plasma, 5 cc. of a reagent containing, per liter, 40 g. mercury bichloride, 120 cc. N-hydrochloric acid and 40 g. of 9 $H_2O$-ferric nitrate. The mixture is stirred and allowed to stand a few minutes, is centrifuged, and the color is observed with a "Lumetron" cell photometer, through a filter.

The results of these tests are given in Table VII below, which indicates salicylhaemia at the end of the indicated periods of time, in each of 12 subjects, both after absorption of cachet No. 1 and cachet No. 2. The content of salicylate in the plasma is expressed in milligrams per 100 cubic centimeters.

Table VII

| Tested subject | | 10′ | 20′ | 90′ | 180′ |
|---|---|---|---|---|---|
| P | Aspirin/sorbitol | 2.6 | 6.6 | 9.4 | 8 |
|   | Aspirin | 0.40 | 1.60 | 7.5 | 6.6 |
| M | Aspirin/sorbitol | 6.40 | 6.60 | 9.15 | 8.60 |
|   | Aspirin | 5.60 | 7.2 | 9.15 | 6.95 |
| H | Aspirin/sorbitol | 5.1 |  | 6.7 | 6.6 |
|   | Aspirin | 1.6 |  | 6.4 | 6 |
| A | Aspirin/sorbitol | 1.6 | 2.60 | 7.8 | 7.4 |
|   | Aspirin | 0.6 | 1.2 | 7.8 | 7.5 |

| | | 60′ | 90′ | 120′ | 180′ |
|---|---|---|---|---|---|
| L | Aspirin/sorbitol | 0.60 | 2.6 | 8.8 | 7.8 |
|   | Aspirin | 1 |  | 6.4 | 6.4 |
| M | Aspirin/sorbitol | 3.2 | 6 | 8.4 | 7.4 |
|   | Aspirin | 0.6 | 1.2 | 4 | 8 |
| D | Aspirin/sorbitol | 0.6 | 5 | 9 | 8.8 |
|   | Aspirin | 0.6 | 2 | 9.6 | 7.4 |
| H | Aspirin/sorbitol | 4.6 |  | 11 | 7.9 |
|   | Aspirin | 0 | 0.6 | 5 | 5.6 |
| G | Aspirin/sorbitol | 1 |  | 10 | 8 |
|   | Aspirin | 0 | 1.2 | 9.4 | 7 |
| H | Aspirin/sorbitol | 3 |  | 12.6 | 10 |
|   | Aspirin | 1.2 | 5.4 | 7.6 | 6 |
| C | Aspirin/sorbitol | 4 | 5.6 | 8 |  |
|   | Aspirin | 1 | 3.6 | 9.4 |  |
| M | Aspirin/sorbitol | 1.2 | 3.5 | 8.2 | 6.7 |
|   | Aspirin | 0.5 | 4.2 | 7.5 | 6.4 |

It will be seen that in the case of 12 out of the 16 tested subjects, higher salicylhaemia was observed after the aspirin/sorbitol compound than after the aspirin, at each of the four indicated times. In two cases on the other hand the salicylhaemia value was practically the same after absorption of both the composite drug and pure aspirin. Finally in two more cases the salicylhaemia was found to be somewhat higher after absorption of aspirin alone, at differing periods. It is evident that individual variations play an important part, being due to the particular metabolism of the subject, and/or to lack of standard experimental conditions, especially in regard to the time at which the plasma is sampled.

On an average taken over the entire series of tests involving the 16 subjects, it can be seen that the salicylhaemia value is increased by 50% when using the aspirin and sorbitol compound.

Another series of tests was run to determine the comparative rates of elimination of salicyl ion in the urine (salicylurea). In this connection it should be noted that the problem here is complicated by the fact that the analysis will show not only the elimination of free salicylic acid, but also of various salicyluric and glycuronic compounds.

Moreover, the dosage may involve systematic errors in cases where the urine sampling is not effected at precisely the correct times and especially in view of the possible sampling errors arising from the fact that the urine was not withdrawn by probe.

In order to eliminate as far as possible these sources of error, protorrhea and hemikresis were also tested by the procedure described by Lapp, as will be subsequently described herein.

For the salicylurea test each subject was given two cachets No. 1, or respectively two cachets No. 2, at a few days interval. The urine was regularly collected every 6 hours from 6 to 24 hours after absorption of the cachet.

The actual dosing procedure used closely resembles that used in the determination of salicylhaemia. The urine was treated with distilled water to provide a concentration of from 10 to 40 mg. percent, and then acidified with concentrated phosphoric acid and treated with Trinder's reagent.

Table VIII below indicates the test results in the case of five typical subjects; the quantities of salicylic acid are given in grams:

Table VIII

| Subject | | 6 hrs. | 12 hrs. | 18 hrs. | 24 hrs. | Total over 24 hrs. |
|---|---|---|---|---|---|---|
| BOC | Aspirin/sorbitol | 0.168 | 0.185 | 0.04 | 0.173 | 0.568 |
|     | Aspirin | 0.103 | 0.220 | 0.03 | 0.147 | 0.500 |
| JAN | Aspirin/sorbitol | 0.189 | 0.188 | 0.164 | 0.014 | 0.555 |
|     | Aspirin | 0.145 | 0.173 | 0.146 | 0.046 | 0.510 |
| GEN | Aspirin/sorbitol | 0.248 | 0.245 | 0.114 | 0.035 | 0.642 |
|     | Aspirin | 0.242 | 0.231 | 0.0864 | 0.042 | 0.601 |
| DRO | Aspirin/sorbitol | 0.124 | 0.203 | 0.070 | 0.110 | 0.507 |
|     | Aspirin | 0.155 | 0.120 | 0.140 | 0.070 | 0.483 |
| CHA | Aspirin/sorbitol | 0.126 | 0.201 | 0.112 | 0.132 | 0.571 |
|     | Aspirin | 0.140 | 0.108 | 0.081 | 0.092 | 0.421 |

AVERAGE TAKEN OVER THE 5 CASES

| | 6 hrs. | 12 hrs. | 18 hrs. | 24 hrs. | Total |
|---|---|---|---|---|---|
| Aspirin/sorbitol | 0.171 | 0.204 | 0.100 | 0.093 | 0.569 |
| Aspirin | 0.157 | 0.170 | 0.097 | 0.079 | 0.503 |

As previously indicated, protorrhea and hemikresis time tests were carried out by way of confirmation. Protorrhea is defined as the initial flow rate of the drugs from a given emunctory, while hemikresis is the time at the end of which one half the drug has been discharged. A knowledge of these magnitudes, if more widely used, would permit of more accurate adjustment of therapeutics as based on objective data of broad validity rather than procedures relying on the patient's individual reaction after administration of the drug. Objectionable overloads of drug may thus be averted in the case of fatigued or worn-out organs. When determined on normal subjects of average age, and for a given therapeutic dose, the hemikresis time and protorrhea rate may be considered as constants characteristic of each drug.

Determination of protorrhea involves the plotting of discharge curves in which one coordinate is time, e.g. in hours, and the other is the total discharge of drug, here salicylic acid, from time zero to time T, expressed in mg. These discharge curves are in almost all cases linear during an initial period of the total discharge time (this feature stands out particularly clear from the mean discharge curve); this greatly facilitates computation of the protorrhea value. When these curves were plotted in the present instance the following principal results were found.

When the rate of discharge through the initial hour was considered, the range of figures observed were from 10 mg. to 35 mg. in the case of aspirin alone, and from 20 mg. to 35 mg. for the aspirin-sorbitol compound. The resulting protorrhea value is considerably higher for the aspirin-sorbitol compound than for aspirin alone, being equal to 25 for the former as against 18 for the latter.

In determining hemikresis a curve is plotted wherein one coordinate is time and the other coordinate is the logarithm of the quantity of uneliminated salicylic acid remaining in the urine. The points thus plotted are practically aligned, and the point of intersection of this line with a line parallel to the time axis extending through the 500 mg. point, is by definition the point of hemikresis; the corresponding time coordinate is the hemikresis time.

In principle, in determining the time of hemikresis, relationships that exist between the absorbed drug and the metabolized product being dosed in the emunctory, are usually disregarded. In the present instance however the relation between the initial drug and the final product is particularly simple: in fact, the starting drug is acetyl-salicylic acid and the final product that is being dosed is salicylic acid. Now 1 g. of acetyl-salicylic acid contains $$\frac{1 \times 138.12}{180.14} \text{ g.}$$

or 0.800 gram of salicylic acid. In this case therefore, it is convenient to introduce a correction factor indicating that the hemikresis time is attained, not after discharge of 500 mg. salicylic acid, but of 800/2=400 mg. of acetyl-salicylic acid.

The thus corrected average hemikresis time was found to be 14.50 hours for the aspirin-sorbitol compound, and 17.50 hrs. for aspirin alone.

On the basis of the above extensive experiments, it can be safely stated that urinary evacuation of the sorbitol aspirin compound is substantially higher than that of aspirin.

The compared toxicity of aspirin and of the aspirin-sorbitol compound of the invention has been investigated. For this purpose there were used 80 female mice, Webster breed, weighing from 15 to 25 grams. The drugs were given gastrically in a gum-arabic suspension at doses incrementally increasing in a logarithmic ratio. The mean toxic doses were determined by the method of Miller and Tainter by plotting the test results on semi-logarithmic paper. The mean toxic doses were found to be 1.52 grams for aspirin and 1.36 grams for the aspirin-sorbitol compound.

The test results were further investigated statistically by the method of Lichtfield and Wilcoxen. The variation limits in 99% of the cases were found to lie between 1.24 and 1.85 for aspirin and between 1.06 and 1.74 for the compound drug. The two drugs therefore have practically similar toxicity.

The lines of regression have practically similar slopes, 1.48 for aspirin and 1.49 for the compound.

The probability of the results was determined by Pearson's "$X^2$" method, and was found to have the significant value of $P=0.05$.

In sum, the toxicity of the aspirin-sorbitol compound is practically the same as that of aspirin, and it can safely be stated that the increased potency is not accompanied by correspondingly increased toxicity.

Further comparative tests were performed on the analgesic effects of the drug and of aspirin, when given in increased doses to mice. It was established that the median active dose was 0.195/kg. for aspirin and 0.104 g./kg. for the compound, denoting an increase in activity by a factor of 1.9.

Finally the applicant investigated the question as to whether or not the presence of sorbitol resulted in an increased gastric irritation of ulcerigenetic effect.

For this purpose, in a first series of test the effects of aspirin and of the aspirin-sorbitol 1/1 compound were studied on "Shay rats," i.e. rats having a pyloric ligature and in which ulcers had been induced in the rumen. In a second set of tests the ulcerigenetic effect was observed in combination with reserpine, which produces ulcer in the glandular area of the rat's stomach. In a third set of tests the ulcerigenetic effects of aspirin and the compound were compared without previous or simultaneous administering of reserpine. Such ulcerations occur in the glandular area without involving the rumen (oesophagian structure).

*First test run.*—In this set of tests ulcers were induced in the ruminal area of the rats by Shay's technique which consists of effecting a pyloric ligature. The quantitative effects of aspirin and the compound were evaluated by Cahen and Twede's method involving counting the proportion of rats in which ulcers occurred.

The aspirin and the compound were given twice a day for 3 consecutive days in doses of 200 mg./kg., each time (400 mg./kg. a day). On the fourth day an additional 200 mg./kg. dose was given by probang one quarter hour prior to pyloric ligature. The rat was slaughtered 5 hours after the operation.

The results of these tests are given in Table IX which indicate that aspirin and the aspirin-sorbitol compound, far from increasing the proportion of ulcer occurrence in the ruminal area, both inhibit such occurrence. On the other hand, whereas no ulcers were observed in control animals which received physiological serum during 4 days, ulcers did appear in the glandular area in the case of 5 out of 6 rats which had received aspirin, and in only 3 out of 6 rats which had been given the compound drug.

*2nd test run.*—This set of tests investigated the ulcerigenetic action on rats previously treated with reserpine.

Rossi in the United States and more recently Labarre in Belgium have shown that reserpine increases gastric secretion and determines ulcerative phenomena. It was attempted to use this ulcerigenetic effect of reserpine in order to accelerate or intensify the ulcerigenetic effect of aspirin.

It was found that ulcers were induced in 3 out of 9 (33%) of the test animals with 0.6 mg./kg. doses given over 4 days, and in 4 out of 18 animals (23%) with doses of 1 mg./kg. In the controls which received only physiological serum ulcers were observed in 2 out of 18 animals (11%). Simultaneous application of 0.2 aspirin with 0.5 resperpine induced ulcers in 12 out of 18 animals (67%), representing a considerable increase over the effect of resperpine alone wherein the corresponding proportion was only 33%. In the case of the compound drug given in similar doses, ulcer was observed in 7 out of 18 animals (38%), or about the same proportion as for the animals treated with resperpine alone. These results are tabulated in Table X.

*Table IX.—Compared Ulcerigenetic Action of Aspirin and Aspirin/Sorbitol Drug*

[Rats subjected to reserpine treatment. Proportion of rats showing ulcer in the glandular area]

| Drug | Dose/kg. | Date of experiment | | Total of 2 experiments | |
| --- | --- | --- | --- | --- | --- |
| | | 10/3/58 [1] | 17/3/58 [2] | Prop. | Percent |
| Reserpine | 0 mg. 5 | 3/9 | | 3/9 | 33 |
| Do | 1 mg | 1/9 | 3/9 | 4/18 | |
| Aspirin | 200 mg | 7/9 | 5/9 | 12/18 | 67 |
| Reserpine | 0 mg. 5 | | | | |
| Aspirin/sorbitol | 200 mg | 5/9 | 2/9 | 7/18 | 39 |
| Reserpine | 0 mg. 5 | | | | |
| Controls | 0 | 0/9 | 1/9 | 1/18 | 5.5 |

[1] Aspirin and aspirin-sorbitol given once a day.
[2] Aspirin and aspirin-sorbitol given twice a day.

*Table X.—Compared Ulcerigenetic Action of Aspirin and Aspirin/Sorbitol Drug*

[Shay rats (not subjected to reserpine treatment). Proportion of rats showing ulcer in glandular region]

| Drugs | Doses | Glandular ulcer | Rumen ulcer |
| --- | --- | --- | --- |
| Aspirin | 200 m./kg. | 5/6, 84% | 0%, 0/6. |
| Aspirin/sorbitol | 200 mg./kg. | 3/6, 50% | 0%, 0/6. |
| Physiological serum | 0 | 0/6, 0% | 50%, 3/6. |

*Third test run.*—This involved experimentation on normal aminals, i.e. not treated with reserpine.

The effects of aspirin, the compound drug, and serum (control) were compared on three respective groups of 18 rats each; the aspirin was given in two 0.4 g./kg. doses per day 4 consecutive days (0.8 g./kg. per day). The compound was given in similar doses.

Ulcers were found to occur in 1 out of the 18 control animals (5%), 9 out of the 18 aspirin-treated animals (50%) and 5 of the 18 compound-treated rats (28%). This is tabulated in Table XI.

In view of the importance of these tests they were repeated at a later date. This time no ulcers were observed in animals treated with aspirin nor in animals treated with the compound drug, even in doses higher than those indicated above. Although there was some diffuse hyperthermia in the gastric mucous membrane no ulcers formed.

This apparently conflicting result actually confirms the observations published by Barbour in the U.S.A. Barbour induced ulcers in the rat by administering 300 mg./kg. aspirin gastrically, but noted the existence of seasonal variations, indicating that "ulcers induced by similar doses of aspirin under similar experimental conditions were less deep and less frequent during the months of May and June than from September to April."

In sum, it was ascertained beyond dispute that the aspirin-sorbitol compound does not exert a more marked ulcerigenetic effect than does aspirin; in fact it apparently reduces this effect.

*Table XI.—Compared Ulcerigenetic Action of Aspirin and Aspirin-Sorbitol Compound*

[Rats not subjected to reserpine treatment. Proportion of rats showing ulcer in the glandular region]

| Drug | Proportion of rats |
|---|---|
| Aspirin | 9/18, 50%. |
| Aspirin/sorbitol | 5/18, 28%. |
| Controls | 1/18, 5.5%. |

The compared gastric irritant action of aspirin and the compound drug was investigated in the dog. Aspirin is known to cause gastric irritation in the dog which is manifested by vomiting. In this test six dogs were used which had been made to fast 16 hours and an equal high dose of 0.2 g./kg. of aspirin in a gum suspension, and the same dose of aspirin in admixture with 0.2 g. of sorbitol in a similar suspension, were injected by probang. The so-called "crossed" procedure was used wherein the animals were injected with each drug at 8 days interval. The results are given in Table XII. It is seen that out of the 8 dogs, four vomited after the aspirin injection, but none of them did so after injection of the compound drug.

*Table XII.—Compared Emetic Effect of Aspirin (0.20 g./kg.) and Aspirin/Sorbitol Compound (0.2 g./kg. Aspirin+0.2 g./kg. Sorbitol) On Dogs*

| Name of dog | Date | Aspirin | Date | Compound drug |
|---|---|---|---|---|
| 1. Jaunisse | 9/5/58 | — | 19/5/58 | — |
| 2. Noiraud | 19/5/58 | — | 9/5/58 | — |
| 3. Lutece | 20/5/58 | — | 9/5/58 | — |
| 4. Ratier | 27/5/58 | + | 21/5/58 | — |
| 5. Tique | 20/5/58 | + | 12/5/58 | — |
| 6. Adrienne | 16/5/58 | + | 20/5/58 | — |
| 7. Adele | 16/5/58 | + | 21/5/58 | — |
| 8. Frisette | 20/5/58 | — | 19/5/58 | — |

Proportion of dogs affected: 4/8    0/8.

EXAMPLE 2

This example relates to the combination of dimethyl-phenyl pyrazolone (antipyrine) with sorbitol.

*(A) Antipyretic Action*

This action was investigated on rats in a state of hyperthermia induced by subcutaneous injection of a suspension of barm at a concentration of 0.35 cc. per 10 grams of body weight, prepared and injected as described in Example 1.

The experiments involved 40 white rats and the same general procedure was used as in Example 1.

The purpose of the experiments was to compare the effects of antipyrine alone at a dose of 0.2 g. per kg., with the effect of a mixture of antipyrine in the same amount with various quantities of sorbitol, respectively equal to the quantity of antipyrine, and 10 times as high as said quantity, as well as with the effect of sorbitol alone. A 5% antipyrine solution was used, with or without added sorbitol as the case might be. The sorbitol when applied alone was used in a 10% aqueous solution.

The results are summarized in Table XIII wherein the average temperature change as observed in 10 animals was indicated. These results conclusively prove that the effect of antipyrine was increased both in promptness and in duration when an equal amount of sorbitol were added to it.

The duration of the antipyretic activity was also prolonged in cases where the sorbitol was added to the antipyrine in an amount twice higher than the amount of antipyrine, but the increase in effect and duration was less marked and less consistent.

*(B) Analgesic Action*

The same procedure was used as in Example 1, involving intraperitoneal injection of phenyl-quinone. The test animals which reacted positively to such injection had been previously determined.

The animals were observed after oral administration of antipyrine alone, and of the antipyrine-sorbitol mixture. The analgesic was given at variable times prior to the phenyl-quinone injection. In this way not only the intensity of the analgesic effect could be determined by observing the proportion of mice protected against the effect of the phenyl-quinone, but also the time of initiation and the duration of the analgesic action. 254 mice were observed.

The results are summarized in Table XIV wherein the effect of antipyrine alone in a dose of 0.2 gram per kg. weight is compared with the effect of an antipyrine-sorbitol mixture in proportions of 1/1 and 1/10 respectively; as well as to the practically non-existent effect of sorbitol alone. The results show that the admixture of sorbitol with antipyrine results in a greatly enhanced analgesic action. Where the proportion of sorbitol to antipyrine is 10/1, the observed action is swifter but less enduring. Where the said proportion is 1/1, the action is swifter, more intense and more durable.

Clinical tests have also been carried out which confirm that the antipyrine-sorbitol combination, just as the aspirin-sorbitol combination earlier described herein, yields excellent results on human patients and is perfectly well tolerated.

*Table I.—Effect of Sorbitol Addition on the Antipyretic Action of Aspirin*

TEST I

[Fasting rats (temperature rise or drop in ° C.)]

| Drug used | Time in minutes | | | | | | | | |
|---|---|---|---|---|---|---|---|---|---|
| | 20 | 40 | 110 | 130 | 160 | 180 | 220 | 240 | 280 |
| A. Aspirin | +0.46 | +0.10 | −0.07 | −0.07 | −0.37 | −0.47 | −0.17 | −0.27 | −0.06 |
| B. Sorbitol (1 part) plus aspirin (1 part) | −0.13 | −0.30 | −0.53 | −0.73 | −0.80 | −0.81 | −0.80 | −0.80 | −0.37 |
| C. Aspirin (1 part) plus sorbitol (2 parts) | −0.23 | −0.40 | −1.53 | −1.33 | −0.97 | −0.60 | −0.40 | −0.27 | −0.06 |

*Table II.—Effect of Sorbitol Addition on the Antipyretic Action of Aspirin*

TEST II

[Fasting rats (temperature rise or drop in ° C.)]

| Drug used | Time in minutes | | | | | | | | | | | | |
|---|---|---|---|---|---|---|---|---|---|---|---|---|---|
| | 10 | 25 | 60 | 75 | 105 | 120 | 135 | 155 | 185 | 215 | 250 | 290 | 305 |
| D. Aspirin (0.20 g.) plus sorbitol (0.10 g.) | +0.27 | +0.13 | −0.63 | −0.53 | −1.02 | −0.80 | −0.70 | −0.80 | −0.80 | −0.76 | −0.8 | −0.90 | −0.90 |
| E. Aspirin (0.20 g.) plus sorbitol (2 g.) | −0.25 | −0.48 | −1.01 | −0.97 | −1.45 | −12 | −1.01 | −1.22 | −1.97 | −0.72 | −1.52 | −1.80 | −1.07 |

*Table III.—Effect of Sorbitol Addition on the Antipyretic Action of Aspirin*

TEST III

[Fasting rats (temperature rise or drop in ° C.)]

| Drug used | Time in minutes | | | | | | | | | | | |
|---|---|---|---|---|---|---|---|---|---|---|---|---|
| | 10 | 30 | 65 | 120 | 140 | 165 | 190 | 210 | 235 | 265 | 290 | 310 |
| A. Aspirin (0.2 g.) | +0.27 | +0.15 | −0.02 | −0.78 | −0.57 | −1.02 | −0.95 | −0.95 | −0.85 | −0.80 | −1.07 | −1.30 |
| B. Aspirin (0.2 g.) plus sorbitol (2 g.) | +0.07 | −0.30 | −0.50 | −1.12 | −1.12 | −1.22 | −1.32 | −1.20 | −1.30 | −1.60 | −1.85 | −2.02 |

*Table IV.—Effect of Sorbitol Addition on the Antipyretic Action of Aspirin*

TEST IV

[Fasting rats (temperature rise or drop in ° C.)]

| Drug used | Time in minutes | | | | | | | | |
|---|---|---|---|---|---|---|---|---|---|
| | 20 | 55 | 75 | 140 | 175 | 195 | 225 | 260 | 320 |
| A. Aspirin (0.2 g.) | −0.18 | −0.28 | −0.12 | −0.50 | −0.36 | −0.12 | +0.2 | +0.2 | +0.18 |
| B. Aspirin (0.2 g.) plus sorbitol (0.2 g.) | −0.28 | −0.28 | −0.36 | −0.36 | −0.75 | −0.50 | −0.04 | −0.04 | −0.14 |

*Table V.—Effect of Sorbitol Addition on Antipyretic Action of Aspirin*

TEST V

[Fasting rats (temperature rise or drop in ° C.)]

| Drug used | Time in minutes | | | | | | | | | | | | | |
|---|---|---|---|---|---|---|---|---|---|---|---|---|---|---|
| | 10 | 20 | 30 | 40 | 50 | 75 | 190 | 245 | 265 | 295 | 325 | 400 | 420 | 47– |
| A. Aspirin (0.2 g.) | | | −0.12 | | −0.05 | −0.15 | | | | | −0.70 | −0.50 | | −0.42 |
| E. Aspirin (0.2 g.) plus sorbitol (2 g.) | | | −0.28 | | −0.62 | −0.55 | | | | | −1.05 | −0.95 | | −0.70 |
| F. sorbitol (2 g.) | [1]+0.75 | +0.62 | +0.55 | +0.57 | +0.57 | | +0.25 | +0.17 | +0.37 | +0.07 | | | +0.10 | |

[1] Note that sorbitol alone produces an increase in temperature.

Table VI.—Compared Analgesic Actions of Aspirin and Aspirin/Sorbitol Mixtures

[Drug given orally to mice]

| Time lapse from administering of analgesic to observed relief from pain (min.) | Proportion of mice relieved of pain | | C. Aspirin 0.20 g., sorbitol 0.40 | D. Aspirin 0.20 g., sorbitol 0.10 | E. Aspirin 0.20 g., sorbitol 0.40 |
|---|---|---|---|---|---|
| | A. Aspirin 0.20 g. | B. Aspirin 0.20 g., sorbitol 0.20 | | | |
| 5 | 0/12 | 3/12 | 0/12 | 0/6 | 4/6 |
| 10 | 0/12 | 5/12 | 2/12 | 0/6 | 4/6 |
| 15 | 12/30 | 14/24 | 9/12 | 3/6 | 16/24 |
| 20 | 6/12 | 9/12 | 7/12 | 3/6 | 5/6 |
| 25 | 6/12 | 10/12 | 9/12 | 3/6 | 14/18 |
| 30 | 13/24 | 11/12 | 10/12 | 7/12 | 17/18 |
| 45 | 10/18 | 11/12 | 10/12 | 10/12 | 6/6 |
| 60 | 9/18 | 5/6 | 6/6 | | 5/6 |
| 75 | 5/18 | 5/6 | 3/6 | | 4/6 |
| 90 | 5/24 | 4/6 | 5/6 | 4/6 | 7/12 |
| 100 | | | | | |
| 105 | 0/6 | 2/6 | 2/6 | | |
| 110 | 2/12 | | 3/6 | 2/6 | 3/6 |
| 120 | 3/18 | 4/6 | 1/6 | 0/6 | 5/12 |
| 125 | 1/6 | 3/6 | | | |
| 135 | 1/6 | 2/6 | | | |
| 150 | | | | | 6/12 |

Table XIV.—Compared Analgesic Actions of Antipyrine and Antipyrine/Sorbitol Mixtures

[Orally administered to mice]

| Time lapse from administering of drug to observed relief, minutes | A. Antipyrine alone, percent | Proportion of mice relieved of pain. B. Antipyrine (0.20 g.), sorbitol (0.20 g.), percent | C. Antipyrine (0.20 g.), sorbitol (2 g.) percent |
|---|---|---|---|
| 5 | 0 | 75 | 75 |
| 10 | 0 | 75 | 75 |
| 15 | 61 | 91 | 66 |
| 30 | 61 | 60 | 59 |
| 45 | 55 | 41 | 17 |
| 50 | 0 | | |
| 60 | 0 | 33 | 0 |
| 75 | 0 | 0 | |
| 90 | 0 | 0 | |

What I claim is:

A pharmaceutical which comprises aspirin and sorbitol in approximately equal proportions by weight.

Table XIII.—Effect of Sorbitol Addition on Antipyretic Action of Antipyrine

[Fasting rats (temperature rise or drop in °C.)]

| Tests | Drugs used | Time in minutes | | | | | | | | | | |
|---|---|---|---|---|---|---|---|---|---|---|---|---|
| | | 10 | 20 | 30 | 40 | 50 | 60 | 180 | 270 | 330 | 350 | 390 |
| I | A. Antipyrine (0.2 g.) | −0.10 / −10 | −0.5 / 20 | −0.20 / 30 | −0.75 / 40 | −1 / 50 | −1 / 60 | −0.80 / 280 | −1.10 / 300 | −0.70 / 420 | −0.40 | −0.20 |
| II | B. Antypirine (0.2 g.) plus sorbitol (0.2 g.) | +0.12 / 10 | −0.18 / 20 | −0.50 / 30 | −0.60 / 40 | −0.86 / 50 | −1 / 60 | −1.80 / 180 | −1.40 / 200 | −0.90 / 250 | 280 | 320 |
| III | C. Antipyrine (0.2 g.) plus sorbitol (2 g.) | −0.12 / 10 | −0.16 / 20 | −0.16 / 30 | −0.14 / 40 | −0.20 / 50 | −0.21 / 180 | −0.52 / 250 | −0.26 / 265 | +0.10 / 295 | +0.30 / 420 | +0.20 |
| IV | D. Sorbitol (2 g.) | +0.75 | +0.62 | +0.55 | +0.57 | +0.87 | +0.25 | +0.17 | +0.37 | +0.07 | +0.10 | |

References Cited in the file of this patent

UNITED STATES PATENTS

| | | |
|---|---|---|
| 2,793,979 | Syedres | May 28, 1957 |
| 2,841,528 | Myhre | July 1, 1958 |
| 2,857,313 | Cooper et al. | Oct. 21, 1958 |

OTHER REFERENCES

Speel: Amer. Jour. Pharmacy, April 1941, pp. 134–141.